United States Patent [19]
Booker

[11] 3,863,101
[45] Jan. 28, 1975

[54] WARNING SYSTEM FOR INDICATING AUTOMOBILE HEAD LIGHTS ARE ON

[76] Inventor: Robert W. Booker, 410 Orchard St., Dowagiac, Mich. 49047

[22] Filed: May 24, 1974

[21] Appl. No.: 472,973

[52] U.S. Cl. .................................. 315/82, 315/83
[51] Int. Cl. ............................................ B60q 1/04
[58] Field of Search ............... 315/80, 82, 83, 83.1; 340/76; 307/10 LS

[56] References Cited
UNITED STATES PATENTS
3,397,342  8/1968  Dill ................................. 315/83 X Primary Examiner—James B. Mullins
Attorney, Agent, or Firm—Woodhams, Blanchard and Flynn

[57] ABSTRACT

An automotive vehicle having a component for maintaining the engine of the automobile in a running condition whenever the main head light switch is connected to supply electrical current to the high beam and low beam head light circuits. The component is a diode which is connected between the input side of the dimmer switch and the battery side of the coil. As a result, and when the ignition switch is connected to disconnect the flow of electrical current from the battery to the coil and distributor, current will continue to flow between the battery through the main head light switch to the battery side of the coil to maintain the engine in a running condition. Thereafter, the engine will immediately discontinue to run upon an opening of the main head light switch.

3 Claims, 1 Drawing Figure

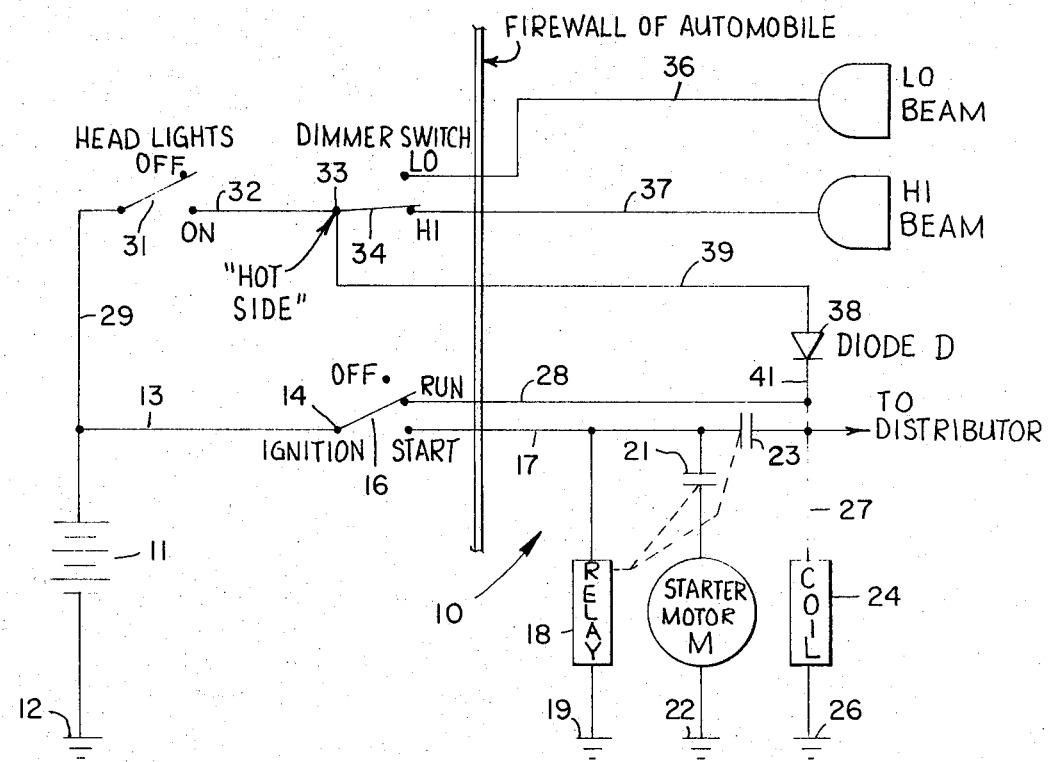

WARNING SYSTEM FOR INDICATING AUTOMOBILE HEAD LIGHTS ARE ON

FIELD OF THE INVENTION

This invention relates to a head light control system for an automotive vehicle and, more particularly, relates to a warning system for warning the driver of the automotive vehicle that electrical current is supplied to the high beam and low beam head light circuits when the ignition switch is connected to disconnect the flow of electrical current to the battery side of the coil.

BACKGROUND OF THE INVENTION

It has been known for some time that the driver of an automobile can be warned that the head lights are still energized upon a deenergizing of the circuit controlling the operation of the automobile engine. Several systems have been developed thus far, which systems include an audible sound being emitted upon a connection of the ignition switch to a position which disconnects the supply of electrical current to the battery side of the coil and to the distributor as well as systems which will maintain the head light circuit energized until a predesignated period of time after a deenergization of the automobile engine and thereafter automatically effect a deenergization of the head light circuit. My system, on the other hand, is designed to accomplish the same result but by an entirely different and nonobvious type of warning signal.

Accordingly, it is an object of this invention to provide an improvement in the known warning systems by providing an electrical connection between the input to the dimmer switch and the battery side of the coil, which electrical connection is composed of a diode which limits the current flow so that current will flow only in one direction from the input terminal to the dimmer switch to the battery side of the coil and the distributor. As a result, current will flow from the battery through the main head light switch and the diode to the battery side of the coil when the ignition switch has been connected to disconnect the current flow to the battery side of the coil. Thus, the engine can only be deenergized upon a connection of the main head light switch to disconnect the current flow to the high beam and low beam head light system.

Other objects and purposes of this invention will be apparent to persons skilled in the art upon a reading of the following specification and inspecting the accompanying drawing.

BRIEF DESCRIPTION OF THE DRAWING

The drawing illustrates an electrical schematic of the electrical circuitry in an automobile, particularly the high beam and low beam head light circuitry, which electrical circuitry embodies the invention.

SUMMARY OF THE INVENTION

In general, the objects and purposes of the invention are met by providing an improved warning signal in an automotive vehicle. The automotive vehicle has an engine, a battery, a coil, an ignition system and lighting control circuitry for a high beam and low beam head light system. The coil, the ignition system and the lighting control circuitry are connected to the battery. The ignition switch is a multiposition-type switch. The high beam and low beam head light system is composed of separate high beam and low beam head light circuits. A first lighting switch is provided for controlling the supply of electrical current from the battery to the high and low beam head light circuits and a second lighting switch is provided for controlling which of the high beam and low beam head light circuits receives the electrical current from the battery. A current control means is connected between an input terminal to the second switch and one side of the coil for permitting current to flow in one direction from the battery through the first switch to the one side of the coil so that when the first lighting switch is connected to supply electrical current to the high beam and low beam head light circuits and the ignition switch is connected to disconnect the supply of electrical current to the battery side of the coil, electrical current will continue to flow to the battery side of the coil through the first lighting switch and the current control means to maintain the engine in a running condition and to thereby warn the driver of the automotive vehicle that electrical current is still supplied to the high beam and low beam head light circuits. The engine may be stopped upon a connecting of the first lighting switch to disconnect the flow of electrical current from the battery to the high beam and low beam head light circuits with the ignition switch connected to disconnect the supply of electrical current to the battery side of the coil.

DETAILED DESCRIPTION

The FIGURE illustrates an electrical schematic 10 in an automotive vehicle. The electrical schematic 10 is composed of a battery 11, the negative side of which is connected to ground as at 12 and the positive terminal is connected through a line 13 to the input terminal 14 of an ignition switch 16. The ignition switch 16 is a multiposition-type switch having at least three positions illustrated by the terminology "off," "run" and "start." The "start" terminal is connected through a line 17 and relay 18 to a ground connection as at 19. In the particular schematic illustrated in the drawing, the "start" terminal of the ignition switch also is connected through the line 17 to a normally open contact 21 and starter motor M to a ground connection as at 22 as well as a circuit parallel thereto composed of a normally open contact 23 and the battery side of the coil 24 to a ground connection as at 26. It is to be recognized that other types of engine starting circuitry can be employed in an automotive vehicle. However, the important position in the entire circuit is the battery side of the coil indicated by the reference numeral 27.

The ignition 16 when in the "run" position is connected through a line 28 to the distributor as well as the battery side 27 of the coil 24. The ignition switch 16 in the "run" position will maintain the engine electrical system in a condition which will permit the engine to run continuously.

The positive terminal of the battery 11 is also connected through a line 29 to the main head light switch 31 having two positions, namely an "off" position and an "on" position. The "on" output terminal of the main head light switch 31 is connected through a line 32 to the input terminal 33 or "hot side" of the dimmer switch 34. The dimmer switch 34 is a two position switch having a "LO" position and a "HI" position. The "LO" output terminal on the dimmer switch 34 is connected through a line 36 to the low beam head light circuit. The "HI" output terminal on the dimmer switch 34 is connected through a line 37 to the high beam head light circuit.

All of the foregoing electrical components in the automotive electrical circuitry are conventional and no invention is claimed therein. However, my improvement is composed of the provision of a diode 38, the anode of which is connected through a line 39 to the input terminal 33 of the dimmer switch 34 and the cathode of which is connected through a line 41 to the battery side 27 of the coil 24 and the distributor.

OPERATION

Although the operation of the circuitry embodying the invention has been indicated somewhat above, the operation will be described in detail hereinbelow for convenience.

When it is desired to start the automobile engine, the ignition switch 16 is moved to the "start" position so that electrical current is supplied from the positive terminal to the battery 11 through the line 13 and line 17 to the relay 18 to effect a closing of the contacts 21 and 23 to supply electrical current to the starter motor M, the battery side 27 of the coil 24 and the distributor. Electrical current will not flow to the head light lighting system due to the reverse biasing characteristics of the diode 38. Once the engine has started, the ignition switch 16 can be moved to the "run" position so that electrical current will continue to flow through the lines 13 and 28 to the battery side of the coil. The relay 18 will be deenergized in the "run" position of the ignition switch 16 to open the normally open contacts 21 and 23.

Thereafter, if the driver of the vehicle should turn the main head light switch 31 from the "off" position to the "on" position, electrical current will be permitted to flow from the positive terminal of the battery 11 through the lines 29 and 32 to the input terminal 33 of the dimmer switch 34. Thus, actuation of the dimmer switch may be completed to the desired "LO" or "HI" position by the operator depending upon the driving circumstances. When the operator turns the ignition switch 16 to the "off" position, current flow is no longer permitted between the positive terminal of the battery 11 and the battery side 27 of the coil 24 and distributor through the ignition switch. However, and due to the biasing characteristics of the diode 38, particularly the positive voltage applied to the anode thereof, electrical current will continue to flow through the lines 29, 32 and 39, the diode 38 and the line 41 to the battery side 27 of the coil 24 and the distributor to maintain the engine in a running condition. The running condition of the engine will be a warning signal to the driver of the vehicle that the head light circuitry is energized. The driver of the vehicle may stop the running condition of the engine by simply turning the main head light switch 31 from the "on" position to the "off" position.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an automotive vehicle having an engine, a battery, a coil, a distributor, an ignition system and lighting control circuitry for a high beam and a low beam head light system connected to said battery, said ignition system including a multiposition ignition switch, said ignition switch connecting in at least one position said battery to one side of said coil and distributor to maintain said engine in a running condition, said high beam and low beam head light system including a high beam head light circuit and a low beam head light circuit and said lighting control circuitry including a first lighting switch for controlling the supply of electrical current from said battery to said high and low beam head light system and a second lighting switch, an input terminal of which is connected to an output terminal of said first lighting switch, said second lighting switch controlling which of said high beam and low beam head light circuits receives said electrical current from said battery, the improvement comprising:

current control means connected between an input terminal to said second lighting switch and said one side of said coil for permitting current to flow in one direction from said battery to said one side of said coil so that when said first lighting switch is connected to supply electrical current to said high beam and low beam head light system and said ignition switch is connected to disconnect the supply of electrical current to said one side of said coil, electrical current will continue to flow to said one side of said coil and distributor through said first lighting switch and said current control means to maintain said engine in a running condition to thereby warn the driver of said automotive vehicle through said running of said engine that said high beam and low beam head light system is energized, said engine discontinuing to run upon a connecting of said first lighting switch to disconnect said electrical current flow to said high beam and low beam head light system with said ignition switch connected to disconnect the supply of electrical current to said one side of said coil.

2. The improvement according to claim 1, wherein said current control means is a diode, the anode of which is connected to said input terminal to said second lighting switch and the cathode of which is connected to said one side of said coil.

3. The improvement according to claim 2, wherein said one side of said coil is the battery side of said coil.

* * * * *